United States Patent
Xu

(10) Patent No.: US 9,854,382 B2
(45) Date of Patent: Dec. 26, 2017

(54) METHOD AND UNIT FOR PROCESSING TRIGGERING INFORMATION OF MTC DEVICES

(71) Applicant: ZTE Corporation, Shenzhen (CN)

(72) Inventor: Hui Xu, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 178 days.

(21) Appl. No.: 14/758,114

(22) PCT Filed: Aug. 13, 2013

(86) PCT No.: PCT/CN2013/081391
§ 371 (c)(1),
(2) Date: Jun. 26, 2015

(87) PCT Pub. No.: WO2014/101430
PCT Pub. Date: Jul. 3, 2014

(65) Prior Publication Data
US 2015/0334509 A1 Nov. 19, 2015

(30) Foreign Application Priority Data
Dec. 28, 2012 (CN) .......................... 2012 1 0585525

(51) Int. Cl.
*H04W 4/00* (2009.01)
*H04B 7/216* (2006.01)
(Continued)

(52) U.S. Cl.
CPC ............. *H04W 4/005* (2013.01); *H04L 67/12* (2013.01); *H04W 4/023* (2013.01); *H04W 4/06* (2013.01); *H04W 4/08* (2013.01)

(58) Field of Classification Search
CPC ............................ H04W 4/005; H04W 76/02
See application file for complete search history.

(56) References Cited

U.S. PATENT DOCUMENTS

2013/0084894 A1* 4/2013 Jain .................. H04W 28/0215
455/458
2013/0115993 A1* 5/2013 Jain ...................... H04W 4/005
455/517
(Continued)

FOREIGN PATENT DOCUMENTS

CN 101931859 A 12/2010
CN 102076028 A 5/2011

OTHER PUBLICATIONS

3GPP TS 23.682 V0.1.0 (Nov. 2011), "Architecture Enhancements to facilitate communications with Packet Data Networks and Applications", (Release 11) Nov. 20, 2011, Section 4.2-4.6; Internet: URL http://www.3gpp.org.
(Continued)

Primary Examiner — Melanie Jagannathan
(74) Attorney, Agent, or Firm — Cantor Colburn LLP

(57) ABSTRACT

Provided is a method for processing triggering information of Machine Type Communication (MTC) devices. The method includes: an MTC-IWF receiving indication information sent by an MTC server, wherein the indication information is used for triggering multiple MTC devices at a same time; the MTC-IWF determining that at least two of the multiple MTC devices belong to different MTC groups; and the MTC-IWF forwarding triggering information to the multiple MTC devices. Through the technical solution, multiple MTC devices not belonging to the same MTC group can be triggered, thereby improving the efficiency of triggering the MTC devices.

11 Claims, 6 Drawing Sheets

(51) Int. Cl.
*H04W 4/06* (2009.01)
*H04W 4/02* (2009.01)
*H04L 29/08* (2006.01)
*H04W 4/08* (2009.01)

(56) References Cited

U.S. PATENT DOCUMENTS

| | | | | |
|---|---|---|---|---|
| 2013/0155954 A1* | 6/2013 | Wang | ............... | H04W 4/005 |
| | | | | 370/328 |
| 2014/0050084 A1* | 2/2014 | Cheng | ............ | H04W 28/0215 |
| | | | | 370/230 |
| 2014/0307632 A1* | 10/2014 | Kim | ............. | H04W 4/005 |
| | | | | 370/328 |
| 2014/0317195 A1* | 10/2014 | Xu | ............. | H04W 4/005 |
| | | | | 709/204 |
| 2015/0256959 A1* | 9/2015 | Jain | ............. | H04W 56/00 |
| | | | | 370/312 |

OTHER PUBLICATIONS

Ericsson, et al, "Device Trigger security", 3GPP TSG SA WG3 (Security) Meeting #66, S3-120178, Feb. 10, 2012, section 1.2.
International Search Report for corresponding application PCT/CN2013/081391 filed Aug. 13, 2013; dated Oct. 31, 2013.

* cited by examiner

METHOD AND UNIT FOR PROCESSING TRIGGERING INFORMATION OF MTC DEVICES

TECHNICAL FIELD

The present disclosure relates to the field of communications, e.g., including a method and apparatus for processing trigger information of machine type communication (MTC) devices.

BACKGROUND

Machine to machine (M2M) refers to all techniques and means for establishing a connection between machines. The theory of M2M has appeared in the 90s of last century, but was still theoretical. Since 2000, with the development of mobile communication technologies, connecting machines to a network has become possible by virtue of the mobile communication technologies. M2M services have appeared in the market of 2002, and developed rapidly in the next few years and becomes the focus of various communication device manufacturers and telecommunication operators. At present, the amount of machines throughout the globe is much larger than that of people, so that the M2M technology is quite prospective in market.

Research on the scenario of M2M communication application shows that providing M2M communication over a mobile network has a great potential market. However, many new requirements have been proposed for M2M services, and in order to enhance the competitiveness of the mobile network in providing the M2M communication, it is necessary to optimize the existing mobile network to more effectively support the M2M communication.

The mobile communication network in the related art is mainly designed for man-to-man communication, and is not sufficiently optimized for machine-to-machine and man-to-machine communication. In addition, it is also a key to success of M2M communication deployment that an operator can provide M2M communication services at a low cost. Based on the above-mentioned reasons, a solution for the mobile network to support the M2M communication appears in the related art. The solution needs to reuse the existing network to a maximum limit, and reduce the influence on the network by large amount of M2M communication and the complexity of operation and maintenance.

The competition in the current telecommunication market is more and more fierce, and the tariff is continuously decreasing, which continuously reduces the benefit of operators. The human based communication market is tending to be saturated, and M2M is a brand new development opportunity to the operators.

In order to effectively utilize mobile network resource, the 3rd generation partnership project (3GPP) has proposed a machine type communication (MTC), i.e. a service of communication from machine to machine or machine to man, the range of the service goes far beyond the traditional communication of Human to Human (H2H). The MTC differs from the existing H2H communication mode a lot in various aspects, such as access control, charging, security, quality of service (QoS), service mode, etc.

In 3GPP evolved packet system (EPS) architecture, the EPS includes a radio access network (such as a UMTS universal terrestrial radio access network (UTRAN), an evolved UTRAN (E-UTRAN), a GSM/EDGE radio access network (GERAN)) and a core network. For example, there are network elements such as a mobile management entity (MME), a serving gateway and a packet data network (PGN) gateway (PGW) in an evolved packet core (EPC) network. A GPRS core network includes network elements such as a serving general packet radio service support node (SGSN). The E-UTRAN includes evolved node B (eNB).

MTC device trigger (Device Trigger) is one of the basic requirements for an MTC system. This requirement focuses on the following problem: in order to control communication of an MTC device, the method of initiating a poll by an MTC server may be used for the communication; and for the communication initiated by the MTC device, the MTC server sometimes also needs to poll data from the MTC device. If query of the MTC server fails or an IP address of the MTC device is unavailable, then the MTC server may use the MTC device trigger to establish communication with the MTC device. If a network cannot trigger the MTC device, the network reports to the MTC server that the MTC device trigger fails. The MTC device trigger is realized in the 3GPP through control plane signalling.

The MTC device trigger includes mobile originated (MO) and mobile terminating (MT) services, that is, includes the MTC device transmitting or receiving information.

In order to realize effective transmission of an MTC device trigger request, proposed solutions includes: transmitting MTC device trigger information through a short message (SMS), or transmitting the MTC device trigger information through control plane signalling. As regards the method for transmitting the MTC device trigger information through the control plane signalling, the MTC server transmits the control plane signalling containing the MTC device trigger information to a network node; and the network node parses the MTC device trigger information in the control plane signalling, and then transmits the MTC device trigger information to a user equipment (UE). The MTC architecture in the 3GPP is as shown in FIG. 1. In the user plane, an MTC application device which is connected with an MTC user communicates with a sequence control system (SCS) of an MTC server control system through an application programming interface (API), or directly communicates with a gateway GPRS support node (GGSN)/PGW/evolved packet data gateway (EPDG) in the 3GPP network through a Gi/SGi interface; the MTC server communicates with the GGSN/PGW/EPDG through the Gi/SGi interface; and the GGSN/PGW/EPDG communicates with a user equipment (UE) through a radio access network (RAN). In the control plane, the MTC server transmits the MTC device trigger information to an MTC interworking function (MTC-IWF) through a Tsp interface; and the MTC-IWF transmits the MTC device trigger information to a short message service-service centre (SMS-SC)/IP-short-message-gateway (IP-SM-GW) through a T4 interface, or the MTC-IWF transmits the trigger information to an MME/SGSN/mobile-services switching centre (MSC) through a T5 interface, and the trigger information is then transmitted to the UE through the RAN, wherein the MME/SGSN may also obtain subscription data from a home subscriber server (HSS) or a home location register (HLR) through an S6a/S6d interface.

The requirement for grouping MTC devices is proposed in 3GPP TS22.368. The grouping of the MTC devices includes: a system associates one MTC device to a single MTC group; each group-based MTC function is applicable to each member of the MTC group; and the identity of the MTC group is unique in the 3GPP network. Group members are generally located in the same area, such as the same tracking area (TA)/routing area (RA)/location area (LA)/eNB.

TR23.888 has a requirement for triggering multiple MTC devices at the same time, for example, an MTC server wants to collect status information of multiple MTC devices. In this case, the multiple MTC devices may be located in different areas, or the multiple MTC devices may not belong to the same MTC group.

In view of the problem in the related art that multiple MTC devices not belonging to the same MTC group cannot be triggered at the same time, no effective solution has been proposed so far.

SUMMARY

In view of the problem in the related art that multiple MTC devices not belonging to the same group cannot be triggered at the same time, the embodiments of the present disclosure provide a method, apparatus and system for triggering MTC devices, so as to at least solve the problem.

According to one aspect of the embodiments of the present disclosure, provided is a method for processing trigger information of MTC devices, including: a machine type communication-interworking function entity (MTC-IWF) receiving indication information sent by an MTC server, wherein the indication information is used for triggering multiple MTC devices at a same time; the MTC-IWF determining that at least two MTC devices of the multiple MTC devices belong to different MTC groups; and the MTC-IWF forwarding trigger information to the multiple MTC devices.

In an example embodiment, the MTC-IWF forwarding the trigger information to the multiple MTC devices includes: the MTC-IWF forwarding the trigger information to one or more access network devices through a core network device, to trigger the one or more access network devices to send the received trigger information to the multiple MTC devices.

In an example embodiment, the MTC-IWF forwarding the trigger information to the one or more access network devices through the core network device includes: the MTC-IWF selecting, according to the indication information, a method for sending trigger information corresponding to each MTC device in the multiple MTC devices; the MTC-IWF setting, according to the method for sending the trigger information corresponding to each MTC device, content of the trigger information corresponding to each MTC device; and the MTC-IWF sending the trigger information to one or more access network devices corresponding to each MTC device through the core network device.

In an example embodiment, the content of the trigger information includes at least one of the following: one or more external identification of one or more MTC devices, and a validity time for triggering the one or more MTC devices.

In an example embodiment, the MTC-IWF respectively forwards the trigger information corresponding to different MTC devices to one or more access network devices in a preset time interval.

In an example embodiment, the MTC group refers to a group of MTC devices located in a same geographical area, and the geographical area includes one of the following: one or more sectors, one or more cells, and one or more public land mobile networks (PLMN).

In an example embodiment, the core network device includes one of the following: a mobile management entity (MME), a serving general packet radio service support node (SGSN), a mobile switching centre (MSC), and a short message service-service centre (SMS-SC).

In an example embodiment, the access network device includes at least one of the following: a base station, an evolved node B (eNodeB), and a node B (NodeB).

According to another aspect of the embodiments of the present disclosure, a method for processing trigger information of an MTC device is further provided, including: an MTC device receiving trigger information sent by one or more access network devices, wherein the trigger information is used for an MTC server to trigger the MTC device; and the MTC device sending, in a preset time interval using a random time delay, a response for indicating that the trigger information is received.

In an example embodiment, the core network device includes one of the following: a mobile management entity (MME), a serving general packet radio service support node (SGSN), a mobile switching centre (MSC), and a short message service-service centre (SMS-SC).

In an example embodiment, the access network device includes at least one of the following: a base station, an evolved node B (eNodeB), and a node B (NodeB).

According to still another aspect of the embodiments of the present disclosure, a sending unit for triggering multiple MTC devices is further provided, including: a first determination module, which is configured to determine that at least two MTC devices of the multiple MTC devices belong to different MTC groups; and a forwarding module, which is configured to forward trigger information to the multiple MTC devices according to received indication information, wherein the received indication information is used for triggering the multiple MTC devices at a same time.

In an example embodiment, the sending unit is configured to forward the trigger information to one or more access network devices through a core network device, to trigger the one or more access network devices to send the received trigger information to the multiple MTC devices.

In an example embodiment, the forwarding module includes: a selection apparatus, which is configured to select, according to the indication information, a method for sending trigger information corresponding to each MTC device in the multiple MTC devices; a second determination apparatus, which is configured to set, according to the method for sending the trigger information corresponding to each MTC device, content of the trigger information corresponding to each MTC device; and a first sending apparatus, which is configured to send the trigger information to one or more access network devices corresponding to each MTC device through the core network device.

In an example embodiment, the sending unit is further configured to respectively forward the trigger information corresponding to the multiple MTC devices to one or more access network devices within a preset time.

In an example embodiment, the sending unit is located on a machine type communication-interworking function entity (MTC-IWF).

According to yet another aspect of the embodiments of the present disclosure, a reception unit for triggering multiple MTC devices is further provided, including: a reception apparatus, which is configured to receive indication information sent by an MTC server, wherein the indication information is used for triggering multiple MTC devices at a same time.

In an example embodiment, the reception unit is located on a machine type communication-interworking function entity (MTC-IWF).

According to still another aspect of the embodiments of the present disclosure, a sending unit for triggering an MTC device is further provided, including:

a second sending apparatus, which is configured to send, within a preset time using a random time delay, a response for indicating that trigger information is received.

In an example embodiment, the sending unit is located on a user equipment, wherein the user equipment includes a terminal and an MTC device.

By means of the embodiments of the present disclosure, an MTC server sends an indication for triggering multiple MTC devices to an MTC-IWF; the MTC-IWF receiving the trigger indication sets the content of the trigger information, selects the method for sending the trigger information, and sends the trigger information to an access network through a core network. In a radio access network, the trigger information may be sent to the multiple MTC devices by means of paging or RRC signalling. The technical solution is able to trigger multiple MTC devices at the same time, optimize a trigger flow, and reduce network resources occupied in a trigger process.

BRIEF DESCRIPTION OF THE ACCOMPANYING DRAWINGS

Drawings, provided for further understanding of the embodiments of the present disclosure and forming a part of the present application, are used to explain the present disclosure together with embodiments of the present disclosure rather than to limit the present disclosure. In the accompanying drawings.

DETAILED DESCRIPTION OF EMBODIMENTS

The present disclosure is described below in detail by reference to the accompanying drawings in conjunction with embodiments. It should be noted that the embodiments of the present application and the features of the embodiments can be combined with each other if there is no conflict.

Figure 1:
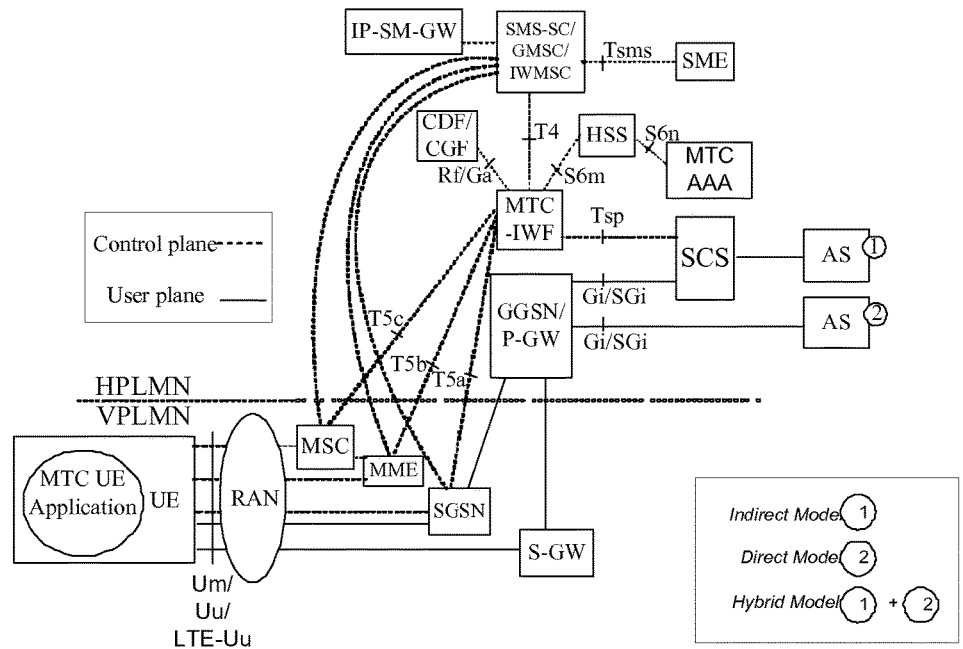
FIG. 1 is a schematic diagram of an MTC architecture in the 3GPP according to the related art.
Figure 2:
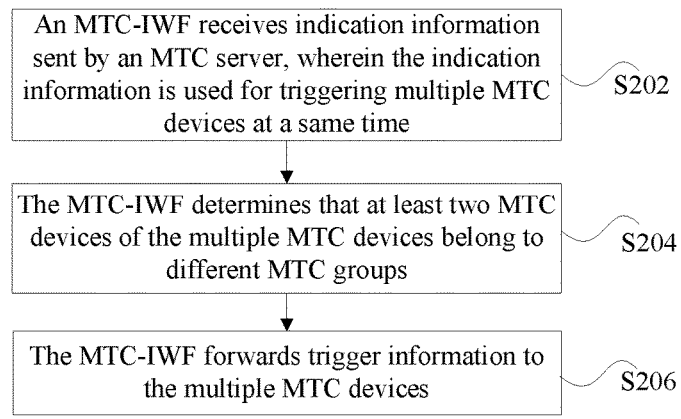
FIG. 2 is a first flowchart of a method for processing trigger information of MTC devices according to an embodiment of the present disclosure.

One embodiment provides a method for triggering MTC devices. FIG. 2 is a first flowchart of a method for processing trigger information of MTC devices according to an embodiment of the present disclosure. As shown in FIG. 2, the method includes the following steps S202-S206.

Step S202: an MTC-IWF receives indication information sent by an MTC server, wherein the indication information is used for triggering multiple MTC devices at a same time.

Step S204: the MTC-IWF determines that at least two MTC devices of the multiple MTC devices belong to different MTC groups.

Step S206: the MTC-IWF forwards trigger information to the multiple MTC devices.

By means of the above-mentioned steps, after receiving the indication information sent by an MTC server and used for triggering multiple MTC devices, the MTC-IWF determines that at least two MTC devices belong to different MTC groups, and then forwards the trigger information to the multiple MTC devices, thereby realizing that multiple MTC devices belonging to different groups can receive information triggered at the same time so as to be triggered at the same time, solving the problem in the related art that MTC devices belonging to different groups cannot be triggered at the same time, and achieving the effect of optimizing the trigger flow of the MTC devices and thus reducing network resources occupied in a trigger process.

As an example embodiment, step S206 may be implemented by using the following methods: the MTC-IWF forwards the trigger information to one or more access network devices through a core network device to trigger the one or more access network devices to send the received trigger information to the multiple MTC devices. In the example embodiment, the trigger information is forwarded to an access network through a core network device, and the one or more access network devices are triggered to forward the trigger information to the multiple MTC devices, thereby realizing the reliable transmission of the trigger information.

In the above-mentioned embodiment, the MTC-IWF forwarding the trigger information to the one or more access network devices through the core network device may be implemented by using the following methods. The MTC-IWF selects, according to the indication information, a method for sending trigger information corresponding to each MTC device in the multiple MTC devices; the MTC-IWF sets, according to the method for sending the trigger information corresponding to each MTC device, the content of the trigger information corresponding to each MTC device; and the MTC-IWF sends the trigger information to one or more access network devices corresponding to each MTC device through the core network device.

In order to realize effective trigger, the content of the trigger information may include at least one of the following: one or more external identification of one or more MTC devices, and a validity time for triggering the one or more MTC devices.

In order to realize the reliability of message transmission, the MTC-IWF respectively forwards the trigger information corresponding to different MTC devices to one or more access network devices in a preset time interval.

In an example embodiment, the MTC group refers to a group of MTC devices located in a same geographical area, and the geographical area includes one of the following: one or more sectors, one or more cells, and one or more PLMNs.

In an example embodiment, the core network device includes one of the following: a mobile management entity (MME), a serving general packet radio service support node (SGSN), a mobile switching centre (MSC), and a short message service-service centre (SMS-SC).

In an example embodiment, the access network device includes at least one of the following: a base station, an evolved node B (eNodeB), and a node B (NodeB).

Figure 3:
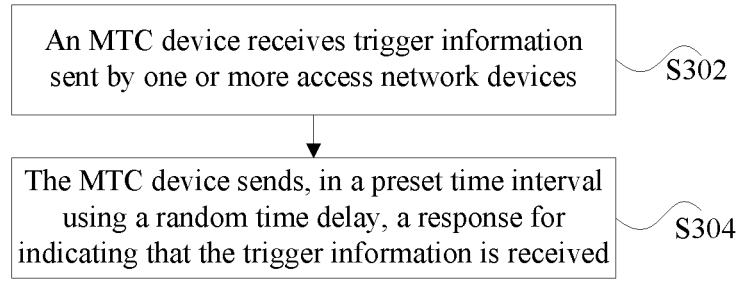
FIG. 3 is a second flowchart of a method for processing trigger information of an MTC device according to an embodiment of the present disclosure.

Another embodiment provides a method for processing trigger information of an MTC device. FIG. 3 is a second flowchart of a method for processing trigger information of an MTC device according to an embodiment of the present disclosure. As shown in FIG. 3, the method includes the following steps S302 and S304.

Step S302: an MTC device receives trigger information sent by one or more access network devices, wherein the trigger information is used for an MTC server to trigger the MTC device.

Step S304: the MTC device sends, in a preset time interval using a random time delay, a response for indicating that the trigger information is received.

By means of the above-mentioned steps, the MTC device can send, in a preset time interval using a random time delay according to the received trigger information, a response for indicating that the trigger information is received, so as to be able to communicate with the MTC server subsequently. This technical solution solves the problem in the related art that MTC devices belonging to different groups cannot be triggered at the same time, and achieves the effect of optimizing the trigger flow of the MTC devices and thus reduces network resources occupied in a trigger process.

In an example embodiment, the core network device includes one of the following: a mobile management entity (MME), a serving general packet radio service support node (SGSN), a mobile switching centre (MSC), and a short message service-service centre (SMS-SC).

In an example embodiment, the access network device includes at least one of the following: a base station, an evolved node B (eNodeB), and a node B (NodeB).

It should be noted that the steps shown in the flowchart of the drawings can be executed, for example, in a computer system with a set of instructions executable by a computer; in addition, a logic order is shown in the flowchart, but the shown or described steps can be executed in a different order under some conditions.

Figure 4:
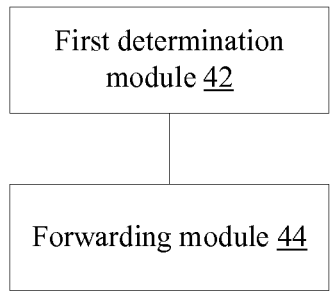
FIG. 4 is a structural diagram of a sending unit for triggering multiple MTC devices according to an embodiment of the present disclosure.

FIG. 4 is a structural diagram of a sending unit for triggering multiple MTC devices according to an embodiment of the present disclosure. As shown in FIG. 4, the apparatus includes: a first determination module 42 and a forwarding module 44, and the structure is described in detail below.

The first determination module 42, which is configured to determine that at least two MTC devices of the multiple MTC devices belong to different MTC groups; and the forwarding module 44, which is coupled with the first determination module 42 and is configured to forward trigger information to the multiple MTC devices according to received indication information, wherein the received indication information is used for triggering the multiple MTC devices at a same time.

In an example embodiment, the sending unit is configured to forward the trigger information to one or more access network devices through a core network device, to trigger the one or more access network devices to send the received trigger information to the multiple MTC devices.

In an example embodiment, the sending unit is configured to forward the trigger information to the one or more access network devices for multiple times within a preset time.

Figure 5:
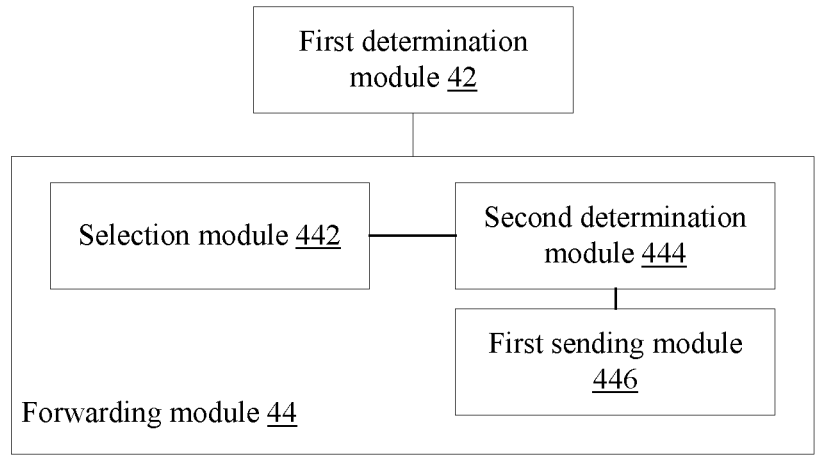
FIG. 5 is an example structural diagram of a sending unit for triggering multiple MTC devices according to an embodiment of the present disclosure.

FIG. 5 is an example structural diagram of a sending unit for triggering multiple MTC devices according to an embodiment of the present disclosure. As shown in FIG. 5, the forwarding module 44 includes: a selection module 442, a second determination module 444 and a first sending module 446, and the structure is described in detail below.

The selection module 442 is configured to select, according to the indication information, a method for sending trigger information corresponding to each MTC device in the multiple MTC devices; the second determination module 444 is coupled with the selection module 442 and is configured to set, according to the method for sending the trigger information corresponding to each MTC device, the content of the trigger information corresponding to each MTC device; and the first sending module 446 is coupled with a second determination module 444 and is configured to send the trigger information to one or more access network devices corresponding to each MTC device through the core network device.

Figure 6:
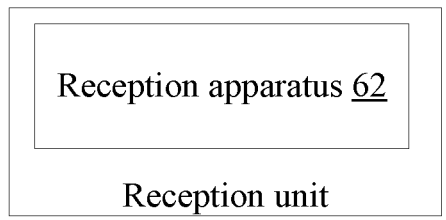
FIG. 6 is a structural diagram of a reception unit for triggering multiple MTC devices according to an embodiment of the present disclosure.

FIG. 6 is a structural diagram of a reception unit for triggering multiple MTC devices according to an embodiment of the present disclosure. As shown in FIG. 6, the reception unit includes: a reception apparatus 62, and the structure is described in detail below.

The reception apparatus 62 is configured to receive indication information sent by an MTC server, wherein the indication information is used for triggering multiple MTC devices at a same time.

In an example embodiment, the reception unit is located on the MTC-IWF.

Figure 7:
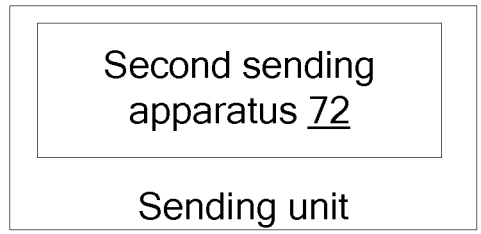
FIG. 7 is a structural diagram of a sending unit for triggering multiple MTC devices according to an embodiment of the present disclosure.

FIG. 7 is a structural diagram of a sending unit for triggering multiple MTC devices according to an embodiment of the present disclosure. As shown in FIG. 7, the sending unit includes a second sending module 72, and the structure is described in detail below.

The second sending apparatus 72 is configured to send, within a preset time using a random time delay, a response for indicating that the trigger information is received.

In an example embodiment, the sending unit is located on a user equipment, wherein the user equipment includes a terminal and an MTC device.

Description will be given below in combination with the example embodiments, and the following example embodiments may combine the above-mentioned embodiments with the example implementations.

Example Embodiment I

Figure 8:
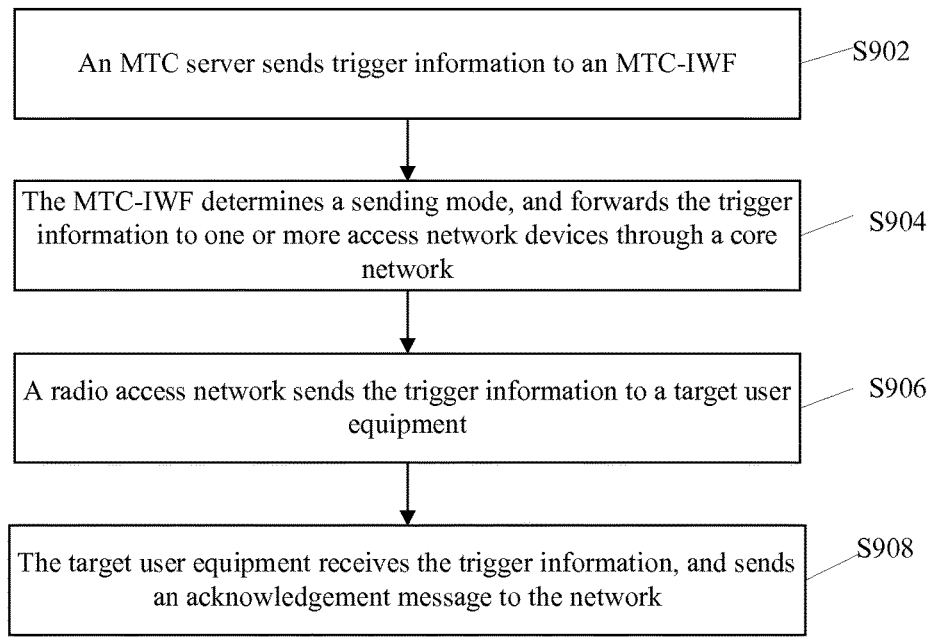
FIG. 8 is a flowchart I for implementing a method for triggering multiple MTC devices at the same time according to an embodiment of the present disclosure.

This embodiment provides a method for triggering multiple MTC devices. FIG. 8 is a flowchart I for implementing a method for triggering multiple MTC devices at the same time according to an embodiment of the present disclosure. As shown in FIG. 8, the method includes the following steps S902-S908.

Step S902, an MTC server sends, to an MTC-IWF, an indication message for triggering multiple MTC devices.

Specifically, the MTC server sets the content of MTC device trigger request information, and sends the MTC device trigger information to a corresponding MTC-IWF.

The MTC server is located outside a 3GPP network or inside a 3GPP network, and includes an application server (AS) and a service capability server (SCS). In the embodiments of the present disclosure, if not specifically stated, the MTC server is an SCS. The content of the MTC device trigger information includes: an MTC device external ID (Device ID) and an MTC device trigger validity timer. Furthermore, the content of the MTC device trigger information may also include at least one of the following: an application ID (APP ID), the priority of the MTC device trigger information, an MTC server identification, an MTC device trigger counter, etc.

In the above content, the MTC device identification is used for identifying a target user equipment. The MTC device identification is an external identification out of a 3GPP network, while a corresponding internal identification within the 3GPP network is an IMSI, and the mapping between the external identification and the internal identification may be completed through an MTC-IWF or an HSS/HLR. In the present embodiment, there may be multiple separate MTC device identifications. The MTC device trigger validity timer is used for indicating the time for deleting the MTC device trigger information. The application ID is used for identifying a subscription application which is required on the target user equipment. The priority of the MTC device trigger information is used for indicating whether the MTC device trigger information is emergency or not. The MTC server identification is used for indicating an MTC server initiating the MTC device trigger information. The MTC device trigger counter is user for indicating whether the information is repeated trigger request information.

Step S904, the MTC-IWF selects a sending mode, and forwards the trigger information to one or more access network devices through a core network device.

Specifically, according to the received trigger request indication, the MTC-IWF selects a method for sending a trigger request, sets the content of a trigger message, and sends the trigger message to a service network node to which each target MTC device belongs.

The MTC-IWF queries the service network node to which each target MTC device belongs through the HSS/HLR.

The network node refers to any one of the following: an MME, an SGSN, an MSC, and an SMS-SC.

Considering that multiple target MTC devices may be located in different areas, there may be one or more network nodes. If the target MTC devices are located in different MMEs, then the MTC-IWF sends trigger information to the multiple MMEs to which the target MTC devices belong.

The step further includes: after the sending of the MTC device trigger information fails, the network node device resends the MTC device trigger information. Furthermore, before resending the MTC device trigger information, the network node device may determine whether to delete the MTC device trigger information or not according to the MTC device trigger validity time in the content of the MTC device trigger information, that is, when the MTC device trigger validity time is reached, the network node device deletes the MTC device trigger information, does not perform a resending operation, and notifies the MTC server that the trigger request fails.

Step S906, after receiving the trigger information, the one or more access network nodes send the trigger information to the target MTC device.

The access network refers to: an EUTRAN, or a UTRAN, or a GERAN. A core network node MME/SGSN/MSC receiving the trigger information judges information of an access network to which the target MTC devices belong according to registration context information or signalling interaction information. The multiple target MTC devices may be located in the range of one or more radio access network nodes, for example, the target MTC devices may be respectively located in the EUTRAN and the GERAN, and then the core network node MME/SGSN/MSC respectively sends the trigger information to the EUTRAN and the GERAN.

Specifically, the MTC device trigger information is forwarded to a target user equipment through a paging message or radio resource control (RRC) signalling, such as a system information block (SIB).

The step further includes: after the sending of the MTC device trigger information fails due to network congestion or overload, a core network device resends the MTC device trigger information. Furthermore, before resending the MTC device trigger information, the core network device may determine whether to delete the MTC device trigger information or not according to the MTC device trigger validity time in the content of the MTC device trigger information, that is, when the MTC device trigger validity time is reached, the core network device deletes the MTC device trigger information, does not perform a resending operation, and notifies the MTC server that the trigger request fails.

Step S908, the target user equipment receives the MTC device trigger information, and sends a reception acknowledgement message to the MTC server.

In an example embodiment, the target MTC device performs processing according to the content of the trigger information, such as establishing a connection with an MTC application server and communicating with the MTC application server.

It should be noted that when multiple target MTC devices receiving the trigger information send response messages at the same time, access network/core network congestion may be caused. In order to prevent the occurrence of this situation, the moment for the multiple MTC devices which receive the trigger information to send the acknowledgement messages is better to be dispersed, that is, not sending the acknowledgement responses at the same time. A specific implementation may be sending the responses by the MTC devices in a random time delay manner, and the length of time delay may be determined using a specific algorithm.

Example Embodiment II

Figure 9:
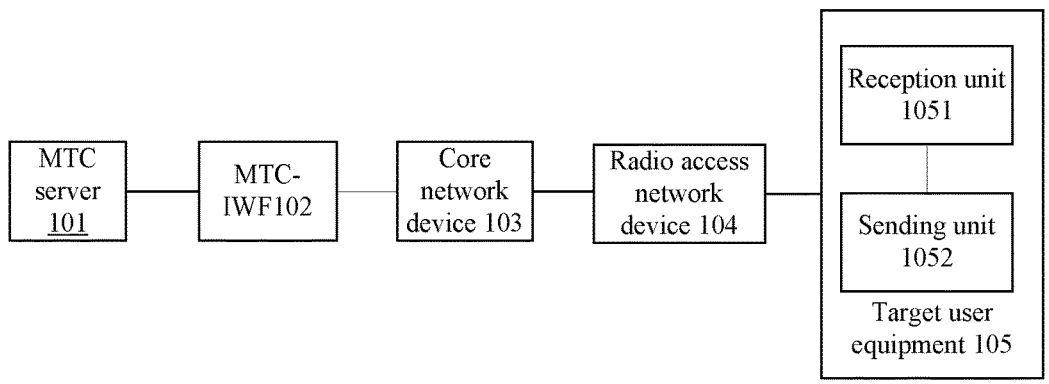
FIG. 9 is a structural diagram of a system for triggering multiple MTC devices at the same time according to an embodiment of the present disclosure.

Corresponding to the implementation method of the above-mentioned example embodiment I, this embodiment further provides a system for triggering multiple MTC devices. FIG. 9 is a structural diagram of a system for triggering multiple MTC devices at the same time according to an embodiment of the present disclosure. As shown in FIG. 9, the system includes: an MTC server 101, an MTC-IWF 102, a core network device 103, a radio access network device 104, and a target user equipment 105. Detailed descriptions are as follows.

The MTC server 101 is used for sending trigger indication information to the MTC-IWF 102, wherein the content of the trigger indication information includes: one or more MTC device identifications and a validity time for triggering the one or more MTC devices.

In an example embodiment, the content of the trigger indication information further includes at least one of the following: an application identification, the priority, an MTC server identification, a trigger counter, etc.

The MTC-IWF 102 is used for selecting a trigger mode, setting the content of a trigger message, and sending the received trigger indication information to the core network device 103.

The MTC-IWF 102 is further used for resending the trigger information after the sending of the trigger information fails.

The core network device 103 is used for determining the radio access network device 104 to which the target user equipment 105 belongs, and forwarding the received trigger information to the radio access network device 104; and the core network device 103 includes at least one of the following: an MME, an SGSN, an MSC, and an SMS-SC.

The radio access network device 104 is used for forwarding the trigger information to the target user equipment 105 by means of a paging message or RRC signalling, and includes one or more of the following: an EUTRAN, a UTRAN, and a GERAN.

The radio access network device 104 is further used for resending the trigger information after the sending of the trigger information fails due to network congestion or overload.

The target user equipment 105 is used for receiving the trigger information and sending an MTC device trigger information acknowledgement message to the radio access network device 104, and communicating with an MTC application server according to the content of the trigger information. The target user equipment 105 is further used for selecting a moment for sending a response message, so as to realize that the multiple target user equipment dispersedly send acknowledgement responses in time, thereby avoiding radio access network or core network congestion.

In the embodiments of the present application, the user equipment may refer to an MTC device, that is, a user equipment with an MTC function.

Figure 10:
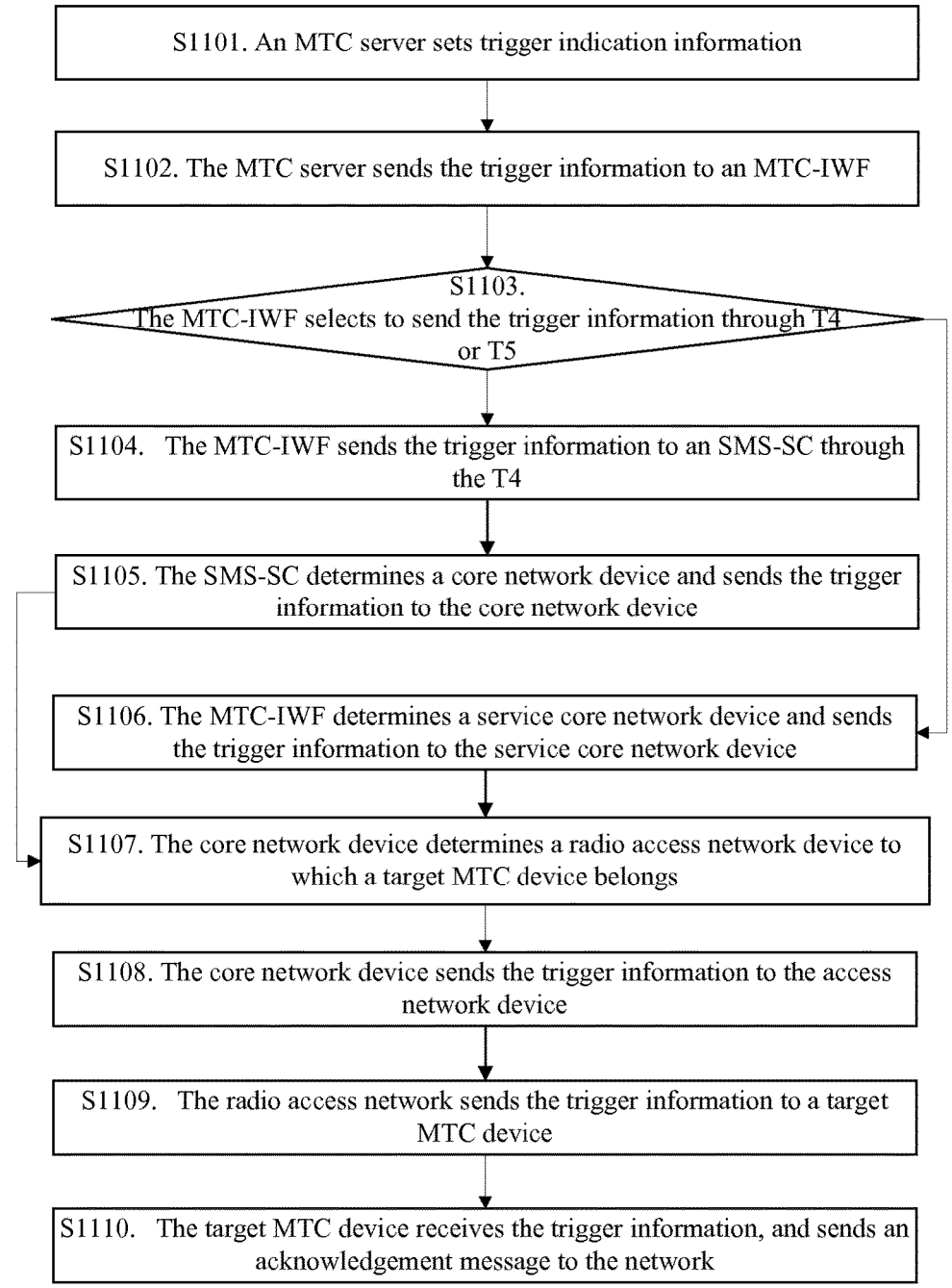
FIG. 10 is a flow diagram II for implementing a method for triggering multiple MTC devices at the same time according to an embodiment of the present disclosure.

In an example embodiment, based on the above-mentioned system, this embodiment further provides a target user equipment. As shown in FIG. 10, the target user equipment 105 includes a reception unit 1051 and a sending unit 1052, wherein the target user equipment 105 includes a reception unit 1051 and a sending unit 1052, wherein the reception unit 1051 is configured to receive the MTC device trigger information sent by the radio access network device 104; and the sending unit 1052 is configured to send an MTC device trigger information acknowledgement message to the radio access network device 104.

In an example embodiment, the target user equipment may further include a smart phone.

Example Embodiment III

This embodiment provides a method for MTC trigger. In this embodiment, in a scenario that multiple MTC devices belong to different core network devices, the triggering of the multiple MTC devices is implemented. FIG. 10 is a flow diagram II for implementing a method for triggering multiple MTC devices at the same time according to an embodiment of the present disclosure. As shown in FIG. 10, the method includes the following steps S1101-S1110.

Step S1101, an MTC server sets trigger indication information.

The content of the MTC device trigger information includes: one or more external identification of one or more MTC devices, and a validity time for triggering the one or more MTC devices.

The above-mentioned MTC device identification includes one or more MTC device external identifications.

Step S1102, the MTC server sends the trigger indication information to an MTC-IWF.

The MTC server firstly selects the MTC-IWF through the following method: the MTC server selects the MTC-IWF according to an MTC-IWF identification locally stored by the MTC server, or the MTC server queries an address of the MTC-IWF from a domain name system (DNS) server using the external identification of the MTC device.

The MTC server sends the trigger information to the MTC-IWF through a Tsp interface, wherein the trigger information contains a trigger identification.

Step S1103, the MTC-IWF selects the method for sending the trigger information; if T4 is selected, turn to step S1104; otherwise, turn to step S1106.

The MTC-IWF may select to send the trigger information through the T4 or T5 interface. The MTC-IWF selects the method for sending the trigger information according to subscription information of the target MTC device, the operator strategy, etc.

In this example embodiment, the T4 interface is sending the trigger information through a short message (SMS), and the T5 interface is sending the trigger information through NAS signalling or the SMS.

Step S1104, the MTC-IWF determines an SMS-SC to which the target MTC device belongs, and sends the trigger information to the SMS-SC through the T4 interface.

The MTC-IWF determines a corresponding SMS-SC by querying subscription information of the target MTC device from an HSS/HLR, and sends short message trigger information to the SMS-SC through the T4 interface, wherein it is identified in the short message that the short message is trigger information.

Step S1105, the SMS-SC sends the short message trigger information to a service core network node device to which the target MTC device belongs.

The SMS-SC queries the service core network device through the HSS/HLR or determines the service core network device according to the indication information from the MTC-IWF.

The service core network device may refer to a core network device to which the target MTC device belongs. Multiple target MTC devices may be located in one or more service core network devices, and the SMS-SC sends the trigger information to the one or more service core network devices.

The core network device includes at least one of the following: an MME, an SGSN, and an MSC.

Step S1106, the MTC-IWF determines the service core network node device to which the target MTC device belongs, and sends the trigger information through T5.

The MTC-IWF may select to send the trigger information through the T5 interface. The MTC-IWF queries the service core network device to which the target MTC device belongs through the HSS/HLR, and sends the trigger information to the service core network device through the T5 interface.

The trigger information is a short message or NAS signalling.

Step S1107, the service core network device determines a radio access network to which the target MTC device belongs.

The service core network device determines the radio access network of the target MTC device according to the locally stored target MTC device context information or signalling interaction information.

In an example embodiment, the radio access network includes at least one of the following: an EUTRAN, a UTRAN, and a GERAN.

Step S1108, the service core network sends the trigger information to the radio access network device.

The radio access network device is a base station, and includes at least one of the following: an eNB, an RNC (Radio Network Controller)/NodeB, and a BSC/BSS (Base Station Controller/Base Station Subsystem).

Step S1109, the radio access network device sends the trigger information to a target user equipment.

The radio access network device sends the trigger information to each target MTC device. The radio access network may send the trigger information by means of any one of the following methods: a paging message, and RRC signalling, wherein the RRC signalling includes but is not limited to the following: a cell broadcast service (CBS), a system broadcast message, a multimedia broadcast multicast service (MBMS), and dedicated RRC signalling.

Step S1110, the target MTC device receives the trigger information, and sends an acknowledgement message to a network. The flow ends.

After receiving the trigger information, the target MTC device sends a response message to the network, and performs processing according to the content of the trigger information, such as establishing a connection with the MTC server and communicating therewith.

Example Embodiment IV

Figure 11:
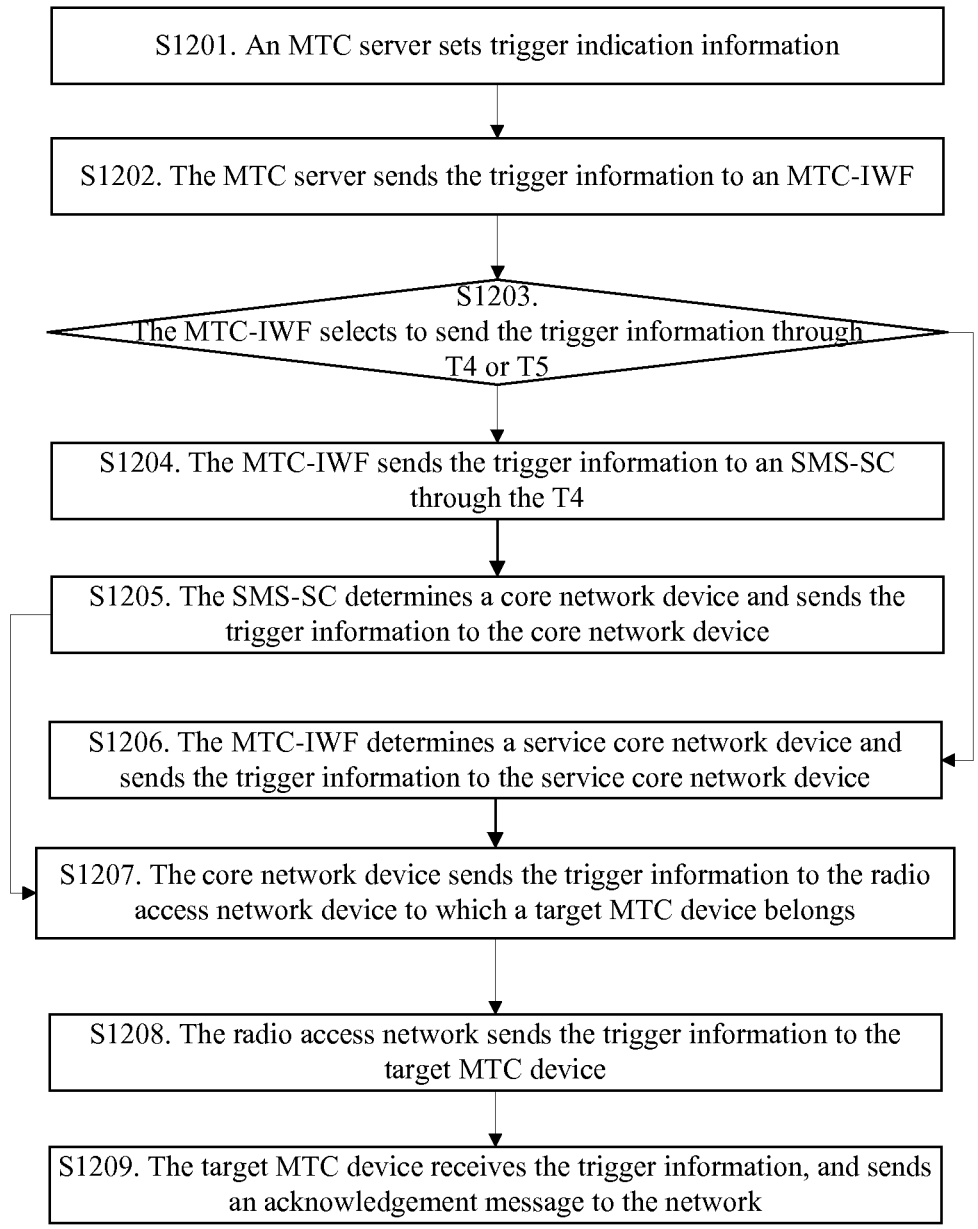
FIG. 11 is a flow diagram III for implementing a method for triggering multiple MTC devices at the same time according to an embodiment of the present disclosure.

This embodiment provides a method for triggering MTC devices. This embodiment is directed to a scenario of triggering multiple MTC devices which are coupled with a network through a gateway. FIG. 11 is a flow diagram III for implementing a method for triggering multiple MTC devices at the same time according to an embodiment of the present disclosure. As shown in FIG. 11, the method includes the following steps S1201-S1209.

Step S1201, an MTC server sets trigger indication information.

The content of the MTC device trigger information includes: one or more external identification of one or more MTC devices, and a validity time for triggering the one or more MTC devices.

There may be one or more external identifications of one or more MTC devices.

The above-mentioned external identification of the MTC device may be an access gateway identification or an address.

Step S1202, the MTC server sends the trigger indication information to an MTC-IWF.

This step is the same as step 202, which will not be described again here.

Step S1203, the MTC-IWF selects the method for sending the trigger information; if T4 is selected, turn to step S1204; otherwise, turn to step S1206.

This step is the same as step S1103, which will not be described again here.

Step S1204, the MTC-IWF determines an SMS-SC to which the target MTC device belongs, and sends the trigger information to the SMS-SC through the T4 interface.

This step is the same as step S1104, which will not be described again here.

Step S1205, the SMS-SC sends the short message trigger information to a service core network node device to which the target MTC device belongs.

This step is the same as step S1105, which will not be described again here.

Step S1206, the MTC-IWF determines the service core network node device to which the target MTC device belongs, and sends the trigger information through the T5.

This step is the same as step S1106, which will not be described again here.

Step S1207, the service core network sends the trigger information to the access network device to which the target MTC device belongs.

This step is similar to steps S1107 and S1108, which will not be described again here.

Step S1208, the access network device sends the received trigger information to the target MTC device through an access gateway.

It should be noted that the MTC device is generally a sensor or other functional modules, which is not directly connected with a 3GPP network generally, but communicates with the 3GPP network through the access gateway. The access network device sends the trigger information to the access gateway; and the access gateway forwards the trigger information to the target MTC device.

Step S1209, the target MTC device which receives the trigger information sends the acknowledgement message to a network through the access gateway; and the flow ends.

The target MTC device performs processing according to the content of the trigger information, such as establishing a connection with an MTC application server and communicating therewith.

By means of the above-mentioned embodiments, a method and apparatus for processing trigger information of MTC devices is provided. An MTC server sends an indication for triggering multiple MTC devices to an MTC-IWF; the MTC-IWF receiving the trigger indication sets the content of the trigger information, selects the method for sending the trigger information, and sends the trigger information to an access network through a core network. In a radio access network, the trigger information can be sent to the multiple MTC devices by means of paging or RRC signalling, thereby realizing that MTC devices belonging to different MTC groups can be triggered at the same time, thus optimizing the trigger flow, and improving the trigger efficiency.

It should be noted that not all the above-mentioned embodiments have these technical effects, some of the technical effects is achieved by some example embodiments.

Obviously, those skilled in the art shall understand that the above-mentioned components and steps of the embodiments of the present disclosure can be realized by using general purpose calculating apparatus, can be integrated in one calculating apparatus or distributed on a network which consists of a plurality of calculating apparatuses. Alternatively, the components and the steps of the disclosure can be realized by using the executable program code of the calculating apparatus. Consequently, they can be stored in the storing apparatus and executed by the calculating apparatus, or they are made into integrated circuit component respectively, or a plurality of components or steps thereof are made into one integrated circuit component. In this way, the present disclosure is not restricted to any particular hardware and software combination.

The above description is only example embodiments of the present document and is not intended to limit the present disclosure, and the present disclosure can have a variety of changes and modifications for ordinary person skilled in the field. Any modification, equivalent replacement, or improvement made within the principle of the present disclosure shall all fall within the protection scope as defined in the appended claims of the present disclosure.

What is claimed is:

1. A method for processing trigger information of machine type communication (MTC) devices, comprising:
   a machine type communication-interworking function entity (MTC-IWF) receiving indication information sent by an MTC server, wherein the indication information is used for triggering multiple MTC devices at a same time;

the MTC-IWF determining that at least two MTC devices of the multiple MTC devices belong to different MTC groups; and the MTC-IWF forwarding trigger information to the multiple MTC devices;

wherein the MTC-IWF forwarding the trigger information to the multiple MTC devices comprises: the MTC-IWF forwarding the trigger information to one or more access network devices through a core network device, to trigger the one or more access network devices to send the received trigger information to the multiple MTC devices through a paging message or radio resource control (RRC) signalling.

2. The method according to claim 1, wherein the MTC-IWF forwarding the trigger information to the one or more access network devices through the core network device comprises: the MTC-IWF selecting, according to the indication information, a method for sending trigger information corresponding to each MTC device in the multiple MTC devices; the MTC-IWF setting, according to the method for sending the trigger information corresponding to each MTC device, content of the trigger information corresponding to each MTC device; and the MTC-IWF sending the trigger information to one or more access network devices corresponding to each MTC device through the core network device.

3. The method according to claim 2, wherein the content of the trigger information comprises at least one of the following: one or more external identification of one or more MTC devices, and a validity time for triggering the one or more MTC devices.

4. The method according to claim 1, wherein the MTC-IWF respectively forwards the trigger information corresponding to different MTC devices to one or more access network devices in a preset time interval.

5. The method according to claim 1, wherein the MTC group refers to a group of MTC devices located in a same geographical area, and the geographical area comprises one of the following: one or more sectors, one or more cells, and one or more public land mobile networks (PLMN).

6. The method according to claim 1, wherein the core network device comprises one of the following: a mobile management entity (MME), a serving general packet radio service support node (SGSN), a mobile switching centre (MSC), and a short message service-service centre (SMS-SC).

7. The method according to claim 1, wherein the access network device comprises at least one of the following: a base station, an evolved node B (eNodeB), and a node B (NodeB).

8. A sending unit for triggering multiple machine type communication (MTC) devices, comprising a hardware processor configured with a memory and configured to execute program modules stored on the memory, wherein the program modules comprise:

a first determination module, which is configured to determine that at least two MTC devices of the multiple MTC devices belong to different MTC groups; and a forwarding module, which is configured to forward trigger information to the multiple MTC devices according to received indication information, wherein the received indication information is used for triggering the multiple MTC devices at a same time;

wherein the sending unit is configured to forward the trigger information to one or more access network devices through a core network device, to trigger the one or more access network devices to send the received trigger information to the multiple MTC devices through a paging message or radio resource control (RRC) signalling.

9. The sending unit according to claim 8, wherein the forwarding module comprises: a selection apparatus, which is configured to select, according to the indication information, a method for sending trigger information corresponding to each MTC device in the multiple MTC devices; a second determination apparatus, which is configured to set, according to the method for sending the trigger information corresponding to each MTC device, content of the trigger information corresponding to each MTC device; and a first sending apparatus, which is configured to send the trigger information to one or more access network devices corresponding to each MTC device through the core network device.

10. The sending unit according to claim 8, wherein the sending unit is further configured to respectively forward the trigger information corresponding to the multiple MTC devices to one or more access network devices within a preset time.

11. The sending unit according to claim 8, wherein the sending unit is located on a machine type communication-interworking function entity (MTC-IWF).

* * * * *